April 30, 1957   C. H. MILLERWISE   2,790,457
FLOAT ARM LOCKING MEANS
Filed June 16, 1954
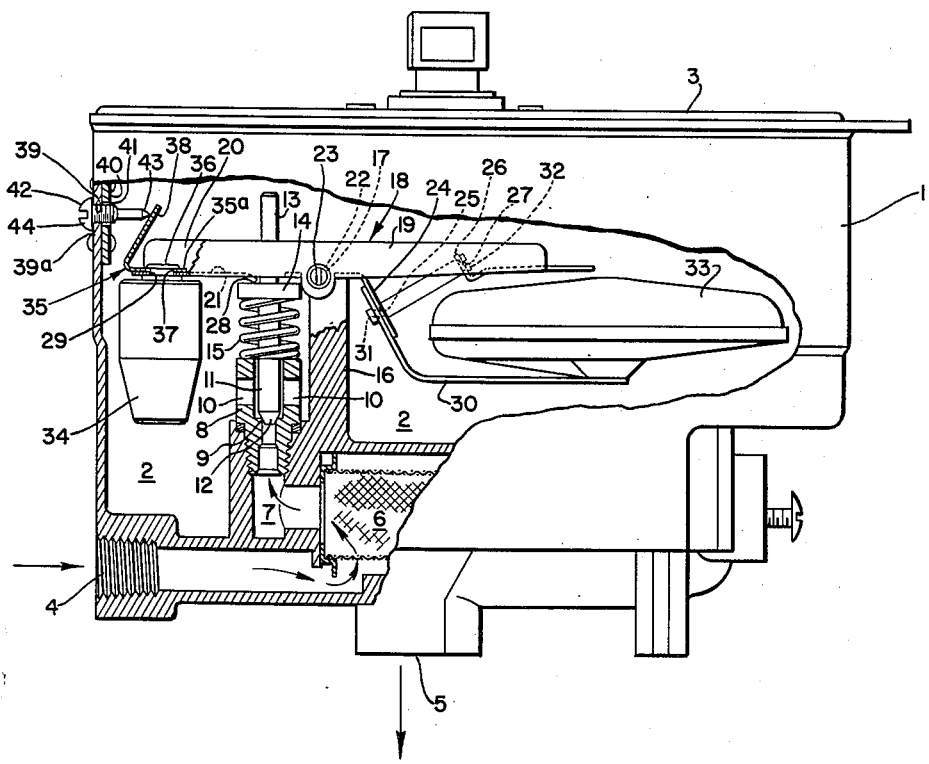
INVENTOR.
CARL H. MILLERWISE
BY
Andrew K. Jonela
his attorney United States Patent Office 2,790,457
Patented Apr. 30, 1957

2,790,457

FLOAT ARM LOCKING MEANS

Carl H. Millerwise, Detroit, Mich., assignor to Detroit Controls Corporation, Detroit, Mich., a corporation of Michigan Application June 16, 1954, Serial No. 437,024

4 Claims. (Cl. 137—316)

This invention relates to new and useful improvements in liquid level controlling means and more particularly to a device for locking or holding the valve member against the valve seat.

In the installation of flow controlled valves, it has been found that damage to the valve seat or valve member has been a troublesome occurrence. This damage has been traced to the fact that the float valve is assembled within the casing at the point of manufacture and shipped to the point of installation in its assembled condition. During shipments the float valve is subjected to the ordinary jarring and vibration which occur in the normal handling of bulk commodities. Since the float valve is pivotally supported in the casing, this vibration causes the valve member to strike the valve seat with such a force that either the valve seat or the valve member will be chipped or distorted. This jarring also causes the valve member to be moved out of alignment with the valve seat. The type of valve members required in float operated liquid level control means, such as the float valves operable to control the amount of liquid fuel supplied to a reservoir to maintain a constant head for metered flow to an oil burner, requires a commonly termed "needle valve" which is of such construction that any slight distortion of either the valve member or the valve seat will cause leakage of liquid fuel therethrough. A damaged valve or valve seat is not easily discernible by visual inspection due to this relatively minute distortion required for leakage. The only positive method of determining whether the valve has been damaged is to assemble the same in a burner system and subject the valve to operating conditions. It is readily seen that this is an unsatisfactory, time consuming, and expensive method of determining whether the valve has been damaged. Also, the replacement of the finely machined "needle valves" and valve seats is an expensive and time consuming process. Therefore, it is an object of this invention to provide a float valve with a means to hold the valve member against the valve seat during shipment, thereby preventing the heretofore described damage.

Another object is to provide a locking means that prevents excessive force from being exerted by the valve member against the valve seat.

Another object is to provide a locking means which is economical to manufacture and easily removed when the float valve is assembled in the burner system.

This invention consists of a novel construction and cooperation of parts to be more fully described hereinafter and the novelty of which will be particularly pointed out and distinctly claimed.

In the accompanying drawing to be taken as part of the specification, there is fully and clearly shown a preferred embodiment of this invention in which drawing, the figure shows the float valve in side elevation with portions of the outer casing broken away and portions of the casing shown in section.

Referring to the drawing, there is shown a hollow casing 1 having a liquid receiving chamber or reservoir 2 and a cover member 3. The casing 1 has an inlet passageway 4 and an outlet 5. The flow through the outlet 5 is controlled by a metering valve which is not shown. The reservoir 2 is supplied with liquid through the inlet passageway 4 in which there is a strainer 6. The inlet passageway 4 opens upwardly as at 7 through the bottom wall of the casing 1 into a guide sleeve 8 having a valve seat 9. The guide sleeve 8 has outlet ports 10 on the outlet side of the valve seat 9 through which the liquid discharges into the reservoir 2. Guided in the sleeve 8 is a valve member 11 having a frustro conical valve head 12 and a valve stem 13. Secured to the valve stem 13 in spaced relation to the valve head 12 is a spring retainer member 14. A coil type spring 15 is positioned around the valve stem 13 and has one of its end portions abutting the upper end of the guide sleeve 8 and its other end portion abutting the underside of the spring retainer member 14, thus biasing the valve head 12 away from the valve seat 9.

Within the reservoir 2 there is a supporting post 16 extending upwardly therein and having an aperture 17 extending through its upper free end portion. A channel shaped lever member 18 has a pair of side flanges 19 and 20 and a web portion 21. The side flanges 19 and 20 have aligned apertures 22 therethrough. The apertures 22 are aligned with the post aperture 17, and a pin member 23 pivotally secures the lever member 18 to the post 16. The web portion 21 has a downwardly bent portion 24 substantially adjacent the post 16 with an aperture 25 therethrough. The web portion 21 also has an upwardly bent portion 26 with an aperture 27 therethrough. The aperture 27 is aligned with the aperture 25. A portion of the web 21 is cut away and has a downwardly bent edge 28 which permits the positioning of the valve stem 13 between the lever side flanges 19 and 20, and the valve spring retainer member 14 abuts the web downwardly bent edge portion 28. A float supporting member 30 has an aperture 31 therethrough which is aligned with the aperture 25 and the supporting member 30 is secured, as by solder or any other securing means, to the downwardly extending web portion 24. An adjusting screw 32 is positioned in the apertures 27, 25, and 31, and is operable to vary the vertical distance between the lever member 18 and the float supporting member or arm 30. Secured to the free end of the supporting member 30 is a float 33. At the opposite end of the lever 18 there is an aperture 29 through the lever web portion 21. A counterweight 34 is secured to the underside of the lever web portion 21 which is operable to counteract the upper force of the spring member 15 and permit the valve member 11 to close under the buoyant force of the float 33 which therefore functions more sensitively.

A locking member 35 is constructed of a resilient spring-like material and has a securing arm portion 35$^a$ and a second arm portion 38. The securing arm portion 35$^a$ has an aperture 37 therethrough and is positioned in abutting relation with the upper side of the lever web portion 21 between the upwardly extending lever member flange portions 19 and 20. The securing arm portion aperture 37 is aligned with the web portion aperture 29 and a rivet member 36 secures the locking member securing arm portion 35$^a$ to the lever member web portion 21. The second arm portion 38 extends upwardly and at an acute angle to the securing arm portion 35$^a$ and is substantially adjacent to the casing side wall 39$^a$. When the valve member 11 is in a closed position, the lever member 18 is in a horizontal plane and substantially normal to the casing side wall 39$^a$. The securing arm portion 35$^a$ being secured to the lever member 18 will also extend in a horizontal plane when the valve member 11 is in a closed position. When the lever member 18 is in a horizontal plane, the locking member second arm portion 38 has its free upper end extending away from the casing side wall 39a and the body portion is in an inclined plane slanting downward toward the casing side wall 39a.

The casing 1 has a threaded aperture 39 through its side wall 39a. The aperture is positioned above the uppermost liquid level in the reservoir 2. A reinforcing backup plate 40 has an aperture 41 therethrough. The backup plate 40 is secured to the inner side of the side wall 39a with its aperture 41 aligned with the casing side wall aperture 39. A locking screw member 42 has a conical end portion 43 and a semi-spherical head portion 44. The screw 42 is inserted from the outer side of the side wall 39a into the threaded aperture 39 and is threadedly secured therein. When the screw 42 is so secured, it extends into the casing on a horizontal plane substantially parallel to the lever member 18. The locking screw conical end portion 43 abuts the locking member second arm 38 substantially adjacent its free end and exerts a horizontal force thereon. Due to the angle of the resilient locking member second arm 38 with the lever member 18, a portion of this horizontal force is transmitted in a vertical downward direction on the end portion of the lever member 18 adjacent to the valve member 11. This downward force rotates the lever member 18 in a counterclockwise direction around the pivot pin 23 and forces the valve head 12 against the valve seat 9. It should be noted that the screw head 44 abuts the outer side of the casing side wall 39a and limits the inward movement of the screw 42. This limitation of movement of the screw 42 also limits the horizontal force exerted on the locking member second arm 38 which, in turn, limits the downward force exerted by the valve head 12 on the valve seat 9. It should also be noted that the resilient construction of the locking member 35 will also limit this downward force exerted by the valve head 12 on the valve seat 9.

*Operation*

The float valve heretofore described operates substantially as follows:

The liquid enters through the inlet passageway 4 and passes upwardly through the guide sleeve 8 and around the valve head 12 and into the reservoir 2 through the outlet ports 10. When the level of the liquid in the reservoir 2 increases to a point where the float member 33 exerts a counterclockwise movement on the spring retainer member 14, the valve head 12 will abut the valve seat 9 and control the flow therethrough. This is substantially the description of a float operated valve wherein the liquid within the chamber or reservoir 2 is controlled by a float member therein. The valve is so constructed that the counterweight 34 prevents the float from being entirely submerged before the float responds to the liquid level and exerts force greater than the force of the spring 15 which biases the valve 11 toward an open position. The weight of the counterweight 34 counteracts the resilient force of the spring 15, thereby permitting more sensitive operation in that the float upon exerting a slight pressure will seat the valve member 11 against the valve seat 9. The screw 32 is used to vary the position of the float within the casing which in turn varies the liquid level at which the float will close the valve member 11.

When the valve is assembled at the point of manufacture, the screw 42 is inserted in the casing aperture 39 as heretofore described and is rotated therein until the conical end portion abuts the upwardly extending portion 38 of the locking arm 35. The screw 42 will exert a downward force on the locking arm 35 which in turn will exert a counterclockwise force on the lever 18. The downwardly extending portion 28 of the lever web 21 exerts a downward force on the valve spring retainer member 14 which will seat the valve head 12 against the valve seat 9. Thus, the valve member 11 is seated against the valve seat 9 independent of the buoyant action of the float member 33. It should be noted that the conical end portion 43 of the screw 42 slides along the face of the locking arm upwardly extending portion 38. Therefore, it is not possible to exert a force on the valve member against the valve seat that is greater than the force of the resilient locking arm 35, because once the valve member 11 is seated on the valve seat 9, any additional force exerted by the screw 42 will tend to bend the upwardly extending portion 38 toward the lever member 18. Also, as heretofore described, the seating of the locking screw semi-spherical head 44 against the outer side of the casing side wall limits the horizontal force exerted on the upwardly extending portion 38. Thus, by the inexpensive addition of the locking arm and locking screw, the valve member 11 may be seated against the valve seat 9 to prevent damage thereto by vibration or jarring motion during shipment and installation. When the flow controlling device has been assembled in the burner system, the screw 42 may be removed from the aperture 39 in the casing 1 and the float operated valve will be free to function under the forces exerted by the float member itself. It should again be noted that the aperture 39 in the casing 1 is above the uppermost liquid level in the reservoir and therefore does not necessarily have to be sealed after the screw 42 is removed therefrom.

Having thus described the invention what is claimed and desired to be secured by Letters Patent of the United States is:

1. In a device of the character described, a casing having an aperture therethrough forming a valve seat therein, a valve member positioned in said casing adjacent to said valve seat, said valve member being movable toward and away from said valve seat and operable to control the flow of liquid through said aperture, a lever member operable to actuate said valve member, a resilient arm member extending from said lever member, and locking means extending through a wall of said casing, said locking means being adjustable to move into abutting relation with said resilient arm member to hold said valve member against said valve seat.

2. In a liquid flow controlling device, a casing having an inlet forming a valve seat therein, a valve member positioned in said casing adjacent to said valve seat, said valve member being movable toward and away from said valve seat and operable to control the flow of liquid through said inlet, a lever member pivotally secured within said casing, a spring member biasing said valve member away from said valve seat and into engagement with said lever member, a resilient locking member having a first arm portion secured to said lever member adjacent to said valve member, a second arm portion extending upwardly at an acute angle to said lever member, locking means carried by said casing and operable to abut said resilient locking member second arm portion thereby holding said valve member against said seat.

3. In a liquid flow controlling device, a casing having an inlet and a side wall having a threaded aperture therethrough, said inlet forming a valve seat within said casing, a valve member positioned in said casing adjacent to said valve seat, said valve member being movable toward and away from said valve seat and operable to control the flow of liquid through said inlet, a lever member pivotally secured within said casing, a spring member biasing said valve member away from said valve seat and into engagement with said lever member, a resilient locking member having a first arm portion secured to said lever member adjacent to said valve member, a second arm portion extending upwardly and at an acute angle to said lever member, and a locking screw extending through said threaded aperture and abutting said resilient locking member second arm portion thereby holding said valve member against said seat.

4. In a liquid flow controlling device, a casing having an inlet and a side wall having a threaded aperture therethrough, said inlet forming a valve seat within said casing, a valve member positioned in said casing adjacent to said valve seat, said valve member being movable toward and away from said valve seat and operable to control the flow of liquid through said inlet, a lever member pivotally secured within said casing, a spring member biasing said valve member away from said valve seat and into engagement with said lever member, a resilient locking member having a first arm portion secured to said lever member adjacent to said valve member, a second arm portion extending upwardly and at an acute angle to said lever member, a locking screw having a head portion and a conical end portion, said screw extending through said threaded apertures with said head portion abutting the outer wall of said casing and said conical end portion abutting said resilient locking member second arm portion thereby holding said valve member against said seat, said locking screw head portion limiting the force exerted by said locking screw conical end portion against said resilient locking member second arm portion thereby limiting the force exerted by said locking screw against said valve member.

References Cited in the file of this patent
UNITED STATES PATENTS 2,427,059    Landon _____ Sept. 9, 1947